(12) United States Patent
Shima et al.

(10) Patent No.: US 10,438,550 B2
(45) Date of Patent: Oct. 8, 2019

(54) DISPLAY DEVICE

(71) Applicant: Japan Display Inc., Minato-ku (JP)

(72) Inventors: Takehiro Shima, Tokyo (JP); Takayuki Nakao, Tokyo (JP)

(73) Assignee: Japan Display Inc., Minato-ku (JP)

( * ) Notice: Subject to any disclaimer, the term of this patent is extended or adjusted under 35 U.S.C. 154(b) by 109 days.

(21) Appl. No.: 15/277,039

(22) Filed: Sep. 27, 2016

(65) Prior Publication Data

US 2017/0124967 A1    May 4, 2017

(30) Foreign Application Priority Data

Oct. 28, 2015   (JP) .................................. 2015-212091

(51) Int. Cl.
*G09G 3/36* (2006.01)
*G02F 1/133* (2006.01)
(Continued)

(52) U.S. Cl.
CPC ......... *G09G 3/3614* (2013.01); *G02F 1/1339* (2013.01); *G02F 1/13306* (2013.01);
(Continued)

(58) Field of Classification Search
CPC .. G09G 3/2011; G09G 3/2077; G09G 3/3614; G09G 3/3648; G09G 3/3688; G09G 3/3611; G09G 3/3677; G09G 3/3696; G09G 2310/06–08; G09G 2300/0857; G09G 2300/0452; G09G 2300/0426; G09G 2320/0271; G09G 2330/00;
(Continued)

(56) References Cited

U.S. PATENT DOCUMENTS 8,836,629 B2    9/2014  Teranishi et al.
9,208,744 B2 *  12/2015  Fukunaga ............ G09G 3/3696
(Continued)

FOREIGN PATENT DOCUMENTS

CN    101281737 A    10/2008
CN    102890376 A    1/2013
(Continued)

OTHER PUBLICATIONS

Office Action dated Nov. 2, 2018, in Chinese Patent Application No. 201610958661.4 (with English-language translation).
(Continued)

*Primary Examiner* — Roberto W Flores
(74) *Attorney, Agent, or Firm* — Oblon, McClelland, Maier & Neustadt, L.L.P.

(57) ABSTRACT

According to one embodiment, a display device includes a pixel electrode and a memory provided in each of pixels, a common electrode, a signal line to which a digital signal is supplied, a first drive line to which a display signal is supplied, a second drive line to which a non-display signal is supplied, a storage control circuit which stores the digital signal in the memory in a storage period, and a select control circuit which selectively supplies, in a display period, to the pixel electrode, one of the display signal and the non-display signal. The second drive circuit maintains potential of the common signal of the display period in the storage period when the display period transitions to the storage period.

7 Claims, 13 Drawing Sheets

(51) Int. Cl.
*G02F 1/1339* (2006.01)
*G02F 1/1343* (2006.01)
*G02F 1/1362* (2006.01)
*G02F 1/1335* (2006.01)
*G02F 1/1368* (2006.01)

(52) U.S. Cl.
CPC .... *G02F 1/13624* (2013.01); *G02F 1/134309* (2013.01); *G02F 1/136286* (2013.01); *G09G 3/3611* (2013.01); *G09G 3/3677* (2013.01); *G09G 3/3688* (2013.01); *G02F 1/1368* (2013.01); *G02F 1/133512* (2013.01); *G02F 1/133514* (2013.01); *G02F 1/133553* (2013.01); *G02F 2001/134345* (2013.01); *G02F 2201/121* (2013.01); *G02F 2201/123* (2013.01); *G02F 2203/04* (2013.01); *G09G 2300/0426* (2013.01); *G09G 2300/0452* (2013.01); *G09G 2300/0857* (2013.01); *G09G 2310/08* (2013.01)

(58) Field of Classification Search
CPC ......... G02F 1/136286; G02F 1/133512; G02F 1/13306; G02F 1/133553; G02F 1/121; G02F 1/123; G02F 1/13624; G02F 1/134309; G02F 1/1339; G02F 1/1368; G02F 2203/04; G02F 2201/123; G02F 1/133514; G02F 2201/121; G02F 2001/134345
See application file for complete search history.

(56) References Cited

U.S. PATENT DOCUMENTS

| | | | | |
|---|---|---|---|---|
| 2007/0063959 | A1* | 3/2007 | Iwabuchi | G09G 3/2074 345/100 |
| 2007/0229447 | A1* | 10/2007 | Takahara | G09G 3/3406 345/102 |
| 2008/0238855 | A1* | 10/2008 | Teranishi | G09G 3/2011 345/98 |
| 2012/0069425 | A1* | 3/2012 | Sato | G09G 3/3446 359/296 |
| 2013/0021542 | A1* | 1/2013 | Ito | G02F 1/133345 349/5 |

FOREIGN PATENT DOCUMENTS

| | | |
|---|---|---|
| JP | H9-243995 A | 9/1997 |
| JP | 2008-256762 | 10/2008 |

OTHER PUBLICATIONS

Office Action dated May 28, 2019, in Chinese Patent Application No. 201610958661.4 (with English-language translation)

* cited by examiner

DISPLAY DEVICE

CROSS-REFERENCE TO RELATED APPLICATIONS

This application is based upon and claims the benefit of priority from Japanese Patent Application No. 2015-212091, filed Oct. 28, 2015, the entire contents of which are incorporated herein by reference.

FIELD

Embodiments described herein relate generally to a display device.

BACKGROUND

Display devices, such as liquid crystal display devices in which a memory is provided in each pixel in a display area, are known. In this type of display device, a storage period and a display period are alternately repeated. In a storage period, digital data based on the image to be displayed is written to each memory. In a display period, an image is displayed in the display area by setting the drive potential of each pixel to potential corresponding to the digital data stored in a corresponding memory. The system for driving the pixels based on the digital data stored in the memories in the above manner is called, for example, a digital mode or a digital drive system.

In addition to the function of a digital mode, display devices having the function of an analog mode (or an analog drive system) to change the drive potential of each pixel to a multilevel gradation are suggested.

To realize the operations in a storage period and display period, various types of circuits and switching elements are provided in each pixel. When the switching elements are on and off, components such as pixel electrodes are electrically changed to a floating state in a storage period. The potential of the components in a floating state varies according to the change in potential of other components. Because of this variation, an undesired electric field is generated in pixels. In this way, the brightness of images may be changed.

Display devices in which the above digital mode is employed are required to improve the display quality.

DETAILED DESCRIPTION

Figure 1:
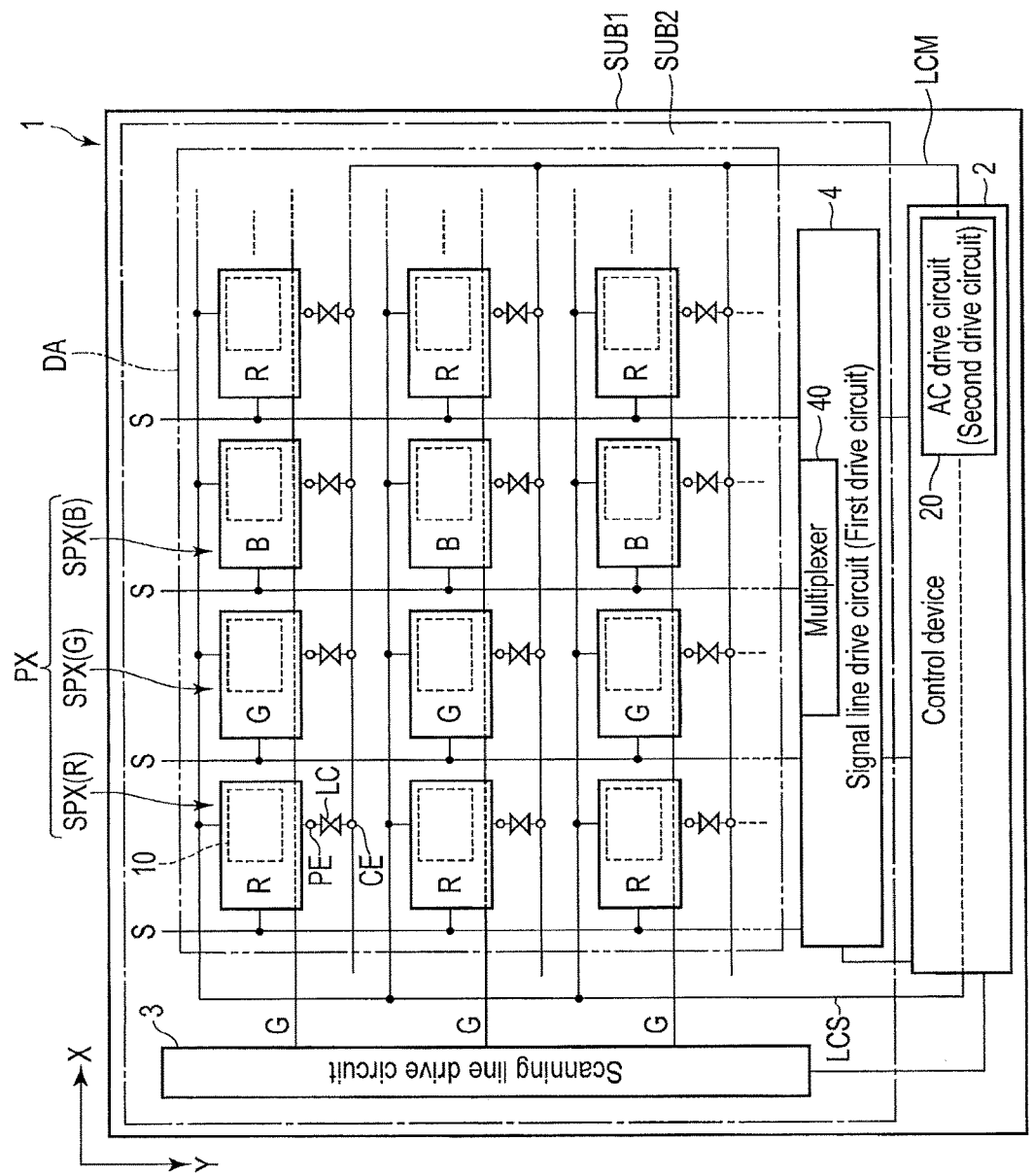
FIG. 1 is a plan view showing a structure common to each embodiment of a display device.

In general, according to each embodiment, a display device comprises: a pair of substrates having a display area in which a plurality of pixels are provided; a liquid crystal layer sealed between the pair of substrates; a pixel electrode provided in each of the pixels; a common electrode which faces the pixel electrode and produces a difference in potential for driving the liquid crystal layer between the common electrode and the pixel electrode; a signal line to which a digital signal based on image data is supplied; a first drive circuit configured to supply the digital signal to the signal line; a second drive circuit configured to supply an AC common signal to the common electrode; a memory provided in each of the pixels in the display area; a first drive line to which a display signal of an image is supplied; a second drive line to which a non-display signal of an image is supplied; a storage control circuit which stores the digital signal supplied to the signal line in the memory in a storage period; and a select control circuit which selectively supplies, in a display period, to the pixel electrode, one of the display signal supplied to the first drive line and the non-display signal supplied to the second drive line, the one corresponding to the digital signal stored in the memory. In the display device, the second drive circuit maintains potential of the common signal of the display period in the storage period when the display period transitions to the storage period.

In each embodiment, the display signal includes first potential and second potential. Potential of the digital signal stored in the memory in the storage period is third potential. When, out of the first potential and the second potential, the potential having a smaller difference from the third potential is potential of the pixel electrode immediately before start of the storage period, the display device stores the third potential in the memory in the storage period.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings are illustrated schematically, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In the specification and drawings, structural elements which function in the same or a similar manner to those described in connection with preceding drawings are denoted by like reference numbers, detailed description thereof being omitted unless necessary.

In each embodiment, as an example of a display device, a reflective liquid crystal display device which has the function of an analog mode for driving pixels by display signals of multilevel gradation and the function of a digital mode as described above is disclosed. However, the embodiments do not prevent application of each technical idea disclosed in the embodiments to other types of display devices. Other types of display devices are assumed to be self-luminance display devices such as organic electroluminescent display devices, or electronic paper display devices having cataphoresis elements, etc.

First, the structures and operations common to the display devices of the embodiments are explained with reference to FIG. 1 to FIG. 5.

FIG. 1 is a plan view showing an example of the general structure of a display device 1. The display device 1 comprises a first substrate SUB1, a second substrate SUB2 and a liquid crystal layer LC. The first substrate SUB1 and the second substrate SUB2 are attached to each other such that they face each other. The liquid crystal layer LC is sealed between the first substrate SUB1 and the second substrate SUB2.

The display device 1 comprises a display area DA. The display area DA is equivalent to an area in which pixels PX are arranged in matrix on the first substrate SUB1. Specifically, a large number of pixels PX are arranged in matrix in a first direction X and a second direction Y in the display area DA. The first direction X is, for example, perpendicular to the second direction Y. Each pixel PX includes red (R), green (G) and blue (B) subpixels SPX. In the present disclosure, the subpixels SPX may be simply called pixels.

In the example of FIG. 1, the subpixels SPX included in one pixel PX are arranged in the first direction X. However, the layout of the pixels PX is not limited to the example of FIG. 1. For example, each pixel PX may further include the subpixels SPX of other colors such as white (W). At least a part of the subpixels SPX included in one pixel PX may be arranged in the second direction Y.

The display device 1 further comprises a plurality of scanning lines G, a plurality of signal lines S, a control device 2, a scanning line drive circuit 3 and a signal line drive circuit 4 (a first drive circuit). The scanning lines G and the signal lines S are formed on the first substrate SUB1. The scanning line drive circuit 3 and the signal line drive circuit 4 are, for example, at least partially formed on the first substrate SUB1, and are connected to the control device 2. The scanning lines G extend from the scanning line drive circuit 3 to the display area DA in the first direction X and are arranged in the second direction Y. The signal lines S extend from the signal line drive circuit 4 to the display area DA in the second direction Y and are arranged in the first direction X. In a planar view, each signal line S passes between subpixels SPX adjacent to each other in the first direction X.

For example, the control device 2 is an integrated circuit mounted on the first substrate SUB1, and functions as a signal supply source which outputs various signals necessary for image display based on the image data input from outside. The control device 2 may not be mounted on the first substrate SUB1 or the second substrate SUB2. The control device 2 may be connected to these substrates via a flexible wiring board. The scanning line drive circuit 3 supplies a scanning signal to each scanning line G in series. The signal line drive circuit 4 comprises a multiplexer 40. For example, the multiplexer 40 is a group of switching elements for switching the output destination of signals between three signal lines S connected to RGB subpixels SPX.

Each subpixel SPX comprises a memory 10 and a pixel electrode PE. The memory 10 stores a digital signal supplied via a signal line S mainly in a digital mode. The pixel electrode PE faces a common electrode CE formed on the second substrate SUB2. The common electrode CE may be formed on the first substrate SUB1. The pixel electrode PE and the common electrode CE may be formed of a transparent conductive material such as indium tin oxide (ITO). The common electrode CE is formed over a plurality of subpixels SPX. The common electrode CE is connected to an AC drive circuit 20 (a second drive circuit) provided in the control device 2 via a common electrode line LCM. An auxiliary capacitance line LCS is also connected to the AC drive circuit 20. The auxiliary capacitance line LCS extends to the display area DA and is connected to the circuits of the subpixels SPX.

The display device 1 comprises a color filter facing each subpixel SPX. Each color filter has a color corresponding to the display color of the subpixel SPX facing the color filter. The color filters are formed on, for example, the second substrate SUB2.

Figure 2:
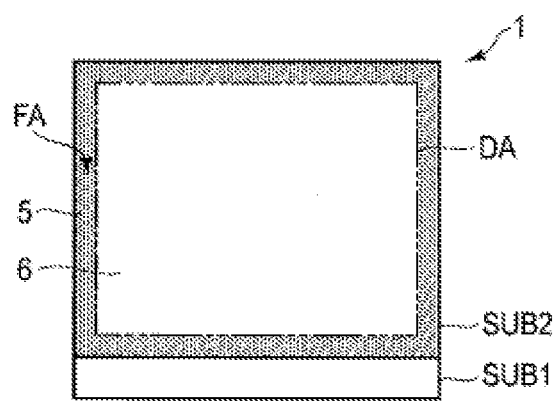
FIG. 2 is a plan view schematically showing a first substrate and a second substrate provided in the display device.

FIG. 2 is a plan view schematically showing the first substrate SUB1 and the second substrate SUB2. A peripheral area FA is formed around the display area DA. The peripheral area FA is equivalent to an area excluding the display area DA from an area in which the first and second substrates SUB1 and SUB2 overlap each other in a planar view. The display device 1 comprises a light-shielding layer 5 overlapping substantially the entire peripheral area FA. The light-shielding layer 5 is provided on, for example, the second substrate SUB2. By providing the light-shielding layer 5, it is possible to prevent light leak from the peripheral area FA and reflection of light by the circuits or lines formed in the peripheral area FA.

A reflective layer 6 which reflects outside light is provided in the display area DA. The reflective layer 6 may be formed of, for example, a metal material. The display device 1 displays an image, using the light reflected by the reflective layer 6. The reflective layer 6 is in contact with one surface of the pixel electrode PE and is formed on the first substrate SUB1 as shown in, for example, FIG. 8 and FIG. 9 explained later. The display device 1 may further comprise a front light provided on a surface of the second substrate SUB2 so as not to face the first substrate SUB1. The display device 1 may further comprise a backlight provided on a surface of the first substrate SUB1 so as not to face the second substrate SUB2. For example, a surface light source device which comprises a lightguide plate facing the display area DA and a plurality of light-emitting diodes provided along the end portion of the lightguide plate may be employed as the front light and the backlight. Further, the display device 1 may comprise a backlight without comprising the reflective layer 6.

For example, the light-shielding layer 5 is not provided in the display area DA. The light-shielding layer 5 does not overlap each signal line S provided between adjacent subpixels SPX in the display area DA. In this way, it is possible to increase the rate of opening of each pixel PX and realize image display with a high brightness. The light-shielding layer 5 may overlap a part of the display area DA. In this case, for example, the light-shielding layer 5 may be formed so as to overlap the scanning lines G.

Figure 3:
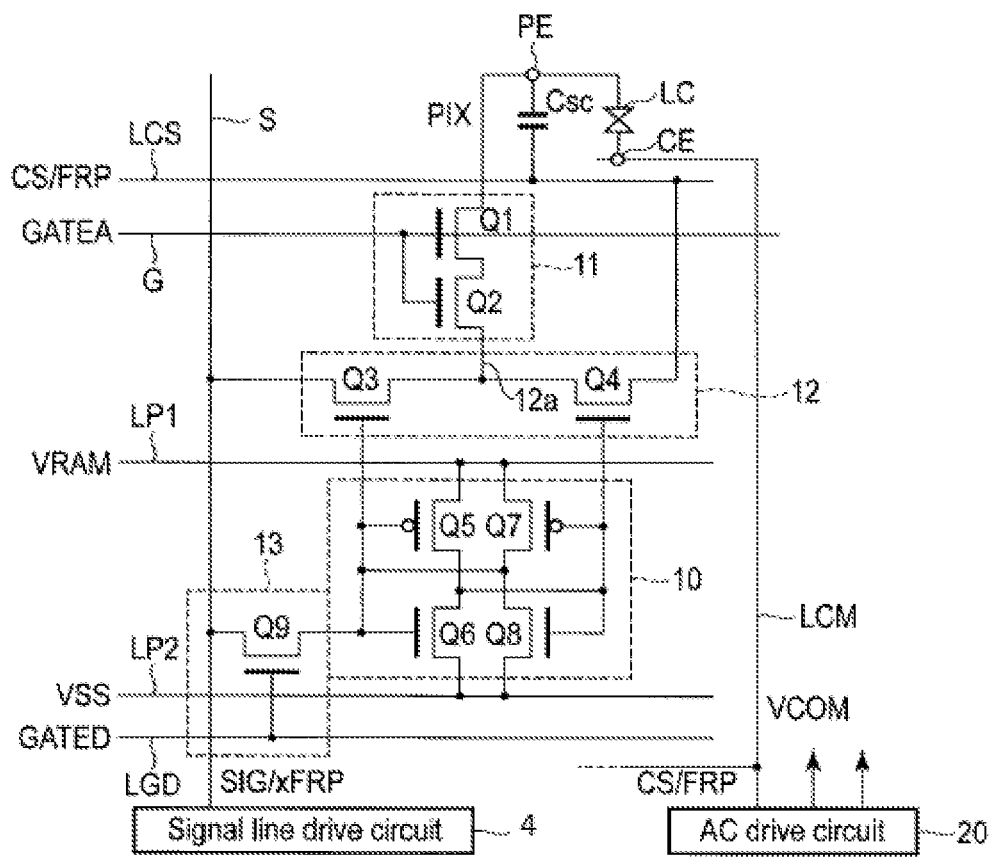
FIG. 3 shows an example of the equivalent circuit of each subpixel provided in the display device.

FIG. 3 shows an example of the equivalent circuit of each subpixel SPX. Each subpixel SPX comprises the above pixel electrode PE, the above memory 10, a gate circuit 11, a select control circuit 12 and a storage control circuit 13.

The gate circuit 11 comprises switching elements Q1 and Q2. In switching elements Q1 and Q2, the scanning line G is connected to the control terminal, and the output terminal is connected to the pixel electrode PE. Switching elements Q1 and Q2 are, for example, double-gate thin-film transistors. A scanning signal GATEA is supplied to the scanning line G such that switching elements Q1 and Q2 are on.

The select control circuit 12 comprises switching elements Q3 and Q4. The input terminal of switching element Q3 is connected to the signal line S. The input terminal of switching element Q4 is connected to the auxiliary capacitance line LCS. A display signal SIG or a first drive signal xFRP is supplied from the signal line drive circuit 4 to the signal line S. An auxiliary capacitance signal CS or a second drive signal FRP is supplied from the AC drive circuit 20 to the auxiliary capacitance line LCS. An auxiliary capacitance Csc for driving the liquid crystal layer LC is formed by the difference in potential between the auxiliary capacitance line LCS and the pixel electrode PE. Further, the select control circuit 12 comprises a select signal line 12a connecting the output terminals of switching elements Q3 and Q4 to the input terminal of switching element Q2. While switching elements Q1 and Q2 are on, the select signal line 12a is electrically connected to the pixel electrode PE. While switching elements Q1 and Q2 are off, the select signal line 12a is electrically disconnected from the pixel electrode PE.

In FIG. 3, the line extending from the AC drive circuit 20 branches to the auxiliary capacitance line LCS and the common electrode line LCM. In this example, the auxiliary capacitance signal CS or the second drive signal FRP supplied to the auxiliary capacitance line LCS has the same potential as the common signal VCOM supplied to the common electrode line LCM.

The memory 10 comprises switching elements Q5 to Q8. A first power source line LP1 for supplying power source voltage VRAM is connected to the input terminals of switching elements Q5 and Q7. A second power source line LP2 to which voltage VSS is supplied is connected to the input terminals of switching elements Q6 and Q8. For example, switching elements Q5 and Q7 are PMOS transistors. Switching elements Q6 and Q8 are NMOS transistors. The output terminals of switching elements Q5 and Q6 are connected to the control terminal of switching element Q4 such that a first CMOS inverter is structured. The output terminals of switching elements Q7 and Q8 are connected to the control terminal of switching element Q3 such that a second CMOS inverter is structured. The first and second inverters are connected in parallel in opposite directions and selectively set one of switching elements Q3 and Q4 to an on-state.

The storage control circuit 13 is a circuit for storing a digital signal in the memory 10, and comprises switching element Q9. The input terminal of switching element Q9 is connected to the signal line S. The output terminal of switching element Q9 is connected to the control terminals of switching elements Q5 and Q6. A digital scanning line LGD is connected to the control terminal of switching element Q9. A scanning signal GATED is supplied to the digital scanning line LGD.

All of switching elements Q1 to Q9 are, for example, thin-film transistors, and are formed on the first substrate SUB1. The auxiliary capacitance line LCS, the scanning line G, the first power source line LP1, the second power source line LP2 and the digital scanning line LGD are also formed on the first substrate SUB1, and are connected to a plurality of subpixels SPX arranged in the first direction X. The signals of the first power source line LP1, the second power source line LP2 and the digital scanning line LGD are supplied from, for example, the control device 2.

The display device 1 having the above structure is capable of driving each subpixel SPX in both an analog mode and a digital mode. The analog mode is a mode for controlling the luminance of each subpixel SPX in multilevel gradation based on the display signal supplied to the signal line S. The digital mode is a mode for controlling the luminance of each subpixel SPX in monochrome by simply controlling on and off based on the digital data stored in the memory 10. In the explanation below, it is assumed that the display device 1 is a display device in a normally-black mode. It is assumed that, when the memory 10 is made high (high potential) in a digital mode, the subpixel SPX is on (white display). It is assumed that, when the memory 10 is made low (low potential), the subpixel SPX is off (black display).

The basic operation of the display device 1 in an analog mode and a digital mode is explained below.

(Analog Mode)

In an analog mode, a scanning pulse is supplied to each scanning line G in series, and further, a display signal of multilevel gradation is supplied to each signal line S in series in accordance with the image data of a subpixel SPX corresponding to each scanning line G to which a scanning pulse is supplied. In this manner, potential based on image data is sequentially written to each group of subpixels SPX arranged in the first direction X (hereinafter, referred to as each horizontal line).

Figure 4:
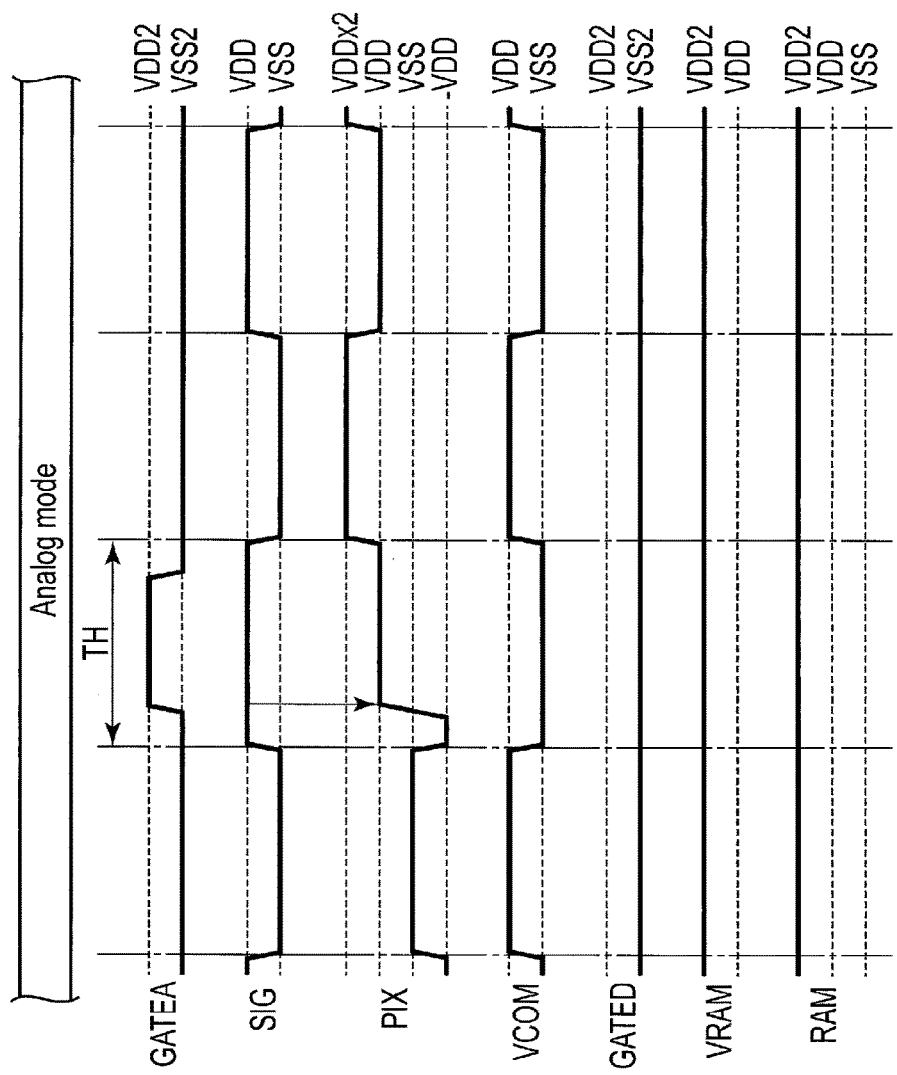
FIG. 4 is a timing chart showing an example of an operation performed in an analog mode by the display device.

FIG. 4 is a timing chart showing an example of an operation performed in an analog mode by the display device 1. The timing chart particularly looks at the subpixel SPX shown in FIG. 3 and shows the change in the scanning signal GATEA supplied to the scanning line G, the display signal SIG supplied to the signal line S, the pixel potential PIX of the pixel electrode PE, the common signal VCOM supplied to the common electrode CE, the scanning signal GATED supplied to the digital scanning line LGD, the power source voltage VRAM supplied to the first power source line LP1 and the memory potential RAM stored in the memory 10. In the explanation below, a period for writing the pixel potential PIX to one horizontal line is defined as a horizontal period TH.

In an analog mode, the memory 10 is made high. The operation for making the memory 10 high is the same as that of FIG. 5 as explained later. When the memory 10 is made high, and the power source voltage VRAM is increased from voltage VDD to voltage VDD2 which is the drive voltage of the subpixel SPX, voltage VDD2 is supplied from the memory 10 to switching element Q3. In this way, switching element Q3 is on. Switching element Q4 is off.

When the scanning signal GATEA of the scanning line G is increased from voltage VSS2 to voltage VDD2 (in other words, when a scanning pulse is input), switching elements Q1 and Q2 are on. In this manner, the pixel electrode PE is connected to the signal line S. At this time, as shown by the arrow in FIG. 4, the pixel potential PIX is set to the level of the display signal SIG of multilevel gradation supplied to the signal line S. After the scanning signal GATEA is decreased to voltage VSS2, the pixel electrode PE is in a floating state.

The difference in potential between the pixel electrode PE and the common electrode CE is maintained by the auxiliary capacitance Csc. Thus, the subpixel SPX displays the color of gradation based on the written pixel potential PIX until the pixel potential PIX is rewritten next.

The example of FIG. 4 shows a case using line-inversion control for inverting the polarity of potential between the pixel electrode PE and the common electrode CE for each horizontal line. Thus, the potential of the common signal VCOM is changed between voltage VSS and voltage VDD depending on the horizontal period TH.

(Digital Mode)

In a digital mode, a storage period and a display period are repeated. In a storage period, a digital signal supplied to a signal line S is stored in the memory 10. In a display period, one of the first drive signal xFRP and the second drive signal FRP is selected and supplied to the pixel electrode PE so as to correspond to the digital signal (high or low) stored in the memory 10.

In a storage period, a scanning pulse is supplied to a digital scanning line LGD in series, and further, a digital display signal of a horizontal line corresponding to the digital scanning line LGD to which a scanning pulse is supplied is supplied to each signal line S in series. In this way, a digital signal based on image data is written to the memory 10 in series for each horizontal line.

Figure 5:
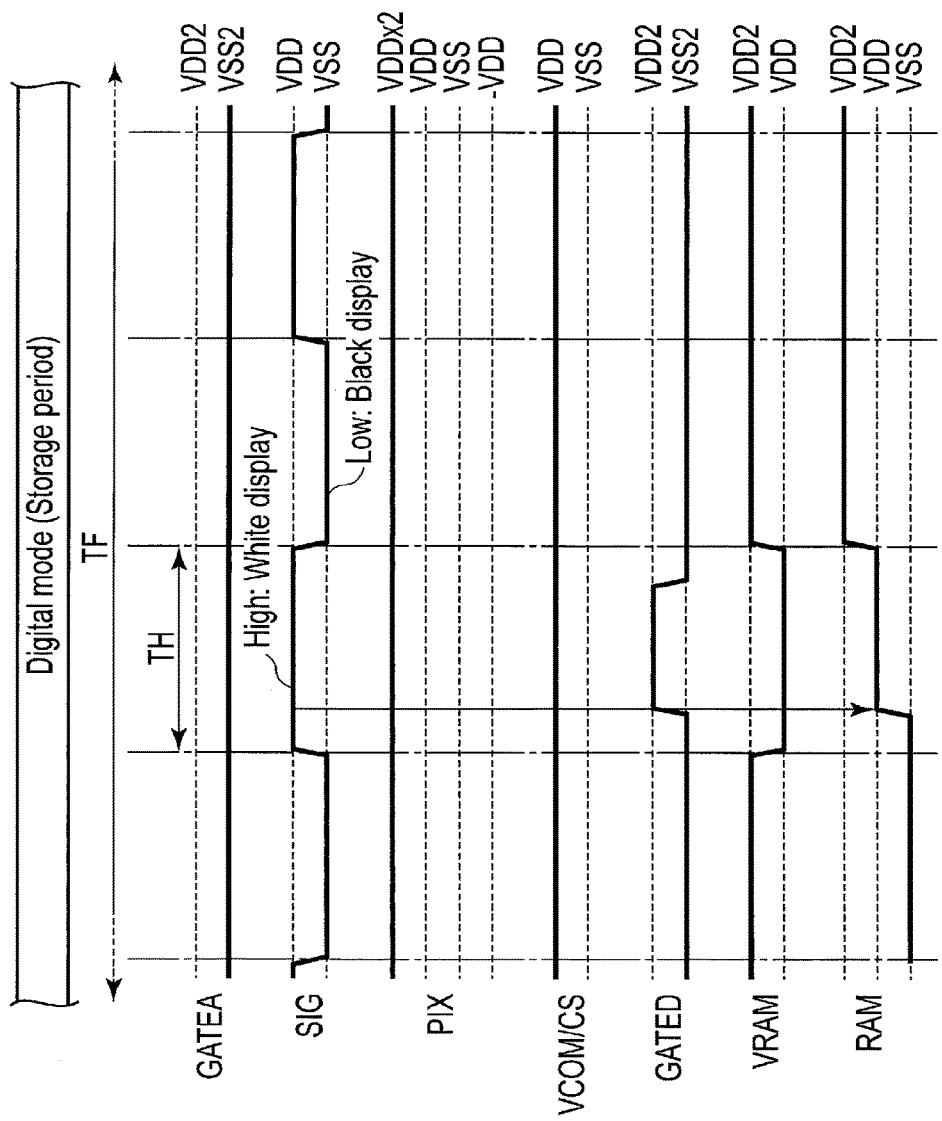
FIG. 5 is a timing chart showing an example of an operation performed in a storage period by the display device.

FIG. 5 is a timing chart showing an example of an operation performed in a storage period by the display device 1. In a manner similar to that of FIG. 4, the timing chart particularly looks at one subpixel SPX. In a storage period, the scanning signal GATEA of the scanning line G is set to voltage VSS2. Thus, the pixel electrode PE is set to a floating state.

In a horizontal period TH for writing data to the memory 10, the display signal SIG of the signal line S is set to the potential to be written to the memory 10. It is assumed that a high voltage VDD corresponds to white display, and a low voltage VSS corresponds to black display. The power source voltage VRAM of the first power source line LP1 is decreased from voltage VDD2 to voltage VDD in a storage period so as to have the same potential as the potential of the memory 10. When the scanning signal GATED of the digital scanning line LGD is increased from voltage VSS2 to voltage VDD2 (in other words, when a scanning pulse is input), switching element Q9 is on, and thus, the memory 10 is connected to the signal line S. At this time, as shown by the arrow in FIG. 5, the level of the display signal SIG supplied to the signal line S is written to the memory 10. In the example of FIG. 5, high is written to the memory 10.

Subsequently, switching element Q9 is set to an off-state by decreasing the scanning signal GATED to voltage VSS2. The power source voltage VRAM is increased to VDD2 which is the voltage for setting switching elements Q3 and Q4 to an on-state. At this time, the voltage of the memory 10 is also increased from VDD to VDD2. In this way, the memory 10 connects the first power source line LP1 and switching element Q3, and sets switching element Q3 to an on-state by the power source voltage VRAM. The memory 10 connects the power source line LP2 and switching element Q4, and sets switching element Q4 to an off-state by voltage VSS. Since switching element Q3 is on, the potential of the signal line S is supplied to the pixel electrode PE.

When the potential supplied to the memory 10 is low corresponding to black display, the memory 10 connects the second power source line LP2 and switching element Q3, and sets switching element Q3 to an off-state by voltage VSS. The memory 10 connects the power source line LP1 and switching element Q4, and sets switching element Q4 to an on-state by the power source voltage VRAM. Since switching element Q4 is on, the pixel electrode PE is connected to the auxiliary capacitance line LCS. Thus, a signal having the same potential as that of the common signal is supplied. In the above manner, the memory 10 exclusively sets switching element Q3 or Q4 to an on-state by the stored voltage, and selects one of the signal line S and the auxiliary capacitance line LCS as the connection destination of the pixel electrode PE.

Figure 6:
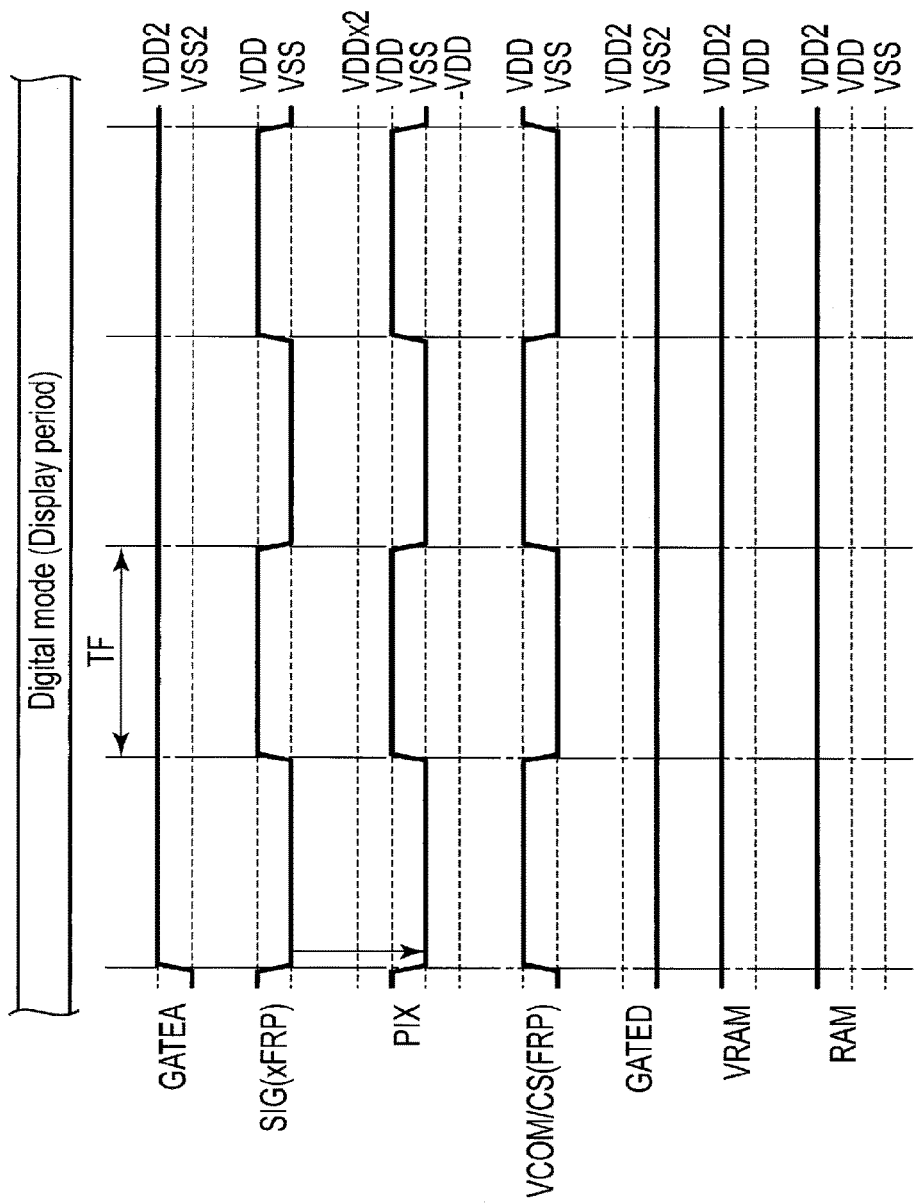
FIG. 6 is a timing chart showing an example of an operation performed in a display period by the display device.

FIG. 6 is a timing chart showing an example of an operation performed in a display period by the display device 1. In a manner similar to that of FIG. 5, the timing chart particularly looks at one subpixel SPX. The examples of FIG. 5 and FIG. 6 show cases using frame-inversion control for periodically inverting the polarity of potential between the pixel electrode PE and the common electrode CE depending on the frame period TF in all of the subpixels SPX arranged in the display area DA. The operation for rewriting the data of each memory 10 in each horizontal line constituting one frame is performed during, for example, one frame period TF. The series of horizontal periods TH shown in FIG. 5 are included in one frame period TF. In each frame period TF, the common signal VCOM and the auxiliary capacitance signal CS are constant. By contrast, as shown in FIG. 6, a display period includes a plurality of frame periods TF. The potential of the common signal VCOM and the potential of the auxiliary capacitance signal CS change between voltage VSS and voltage VDD depending on the frame period TF.

In a display period, the auxiliary capacitance signal CS which changes depending on each frame period TF is equivalent to the AC second drive signal FRP. In a display period, the first drive signal xFRP is supplied to the signal line S. The first drive signal xFRP is an AC signal having a phase opposite to that of the second drive signal FRP, and changes between voltage VDD and voltage VSS depending on the frame period TF.

In a display period, the scanning signal GATEA of the scanning line G is increased from voltage VSS2 to voltage VDD2. When switching element Q3 is set to an on-state by the memory 10, the signal line S is connected to the pixel electrode PE. When switching element Q4 is set to an on-state by the memory 10, the auxiliary capacitance line LCS is connected to the pixel electrode PE. FIG. 6 shows an example in which the signal line S is connected to the pixel electrode PE, and thus, the pixel potential PIX is set to the first drive signal xFRP. In this case, a difference in potential as voltage VDD-voltage VSS is generated between the pixel electrode PE and the common electrode CE. Thus, the subpixel SPX is set to white display. When the auxiliary capacitance line LCS is connected to the pixel electrode PE, no difference in potential is generated between the pixel electrode PE and the common electrode CE. Thus, the subpixel SPX is set to black display.

As is clear from the above explanation, the signal line S has both a function as a signal line supplied with the digital data to be stored in the memory 10 and a function as the first drive line supplied with the first drive signal xFRP, which is the display signal of an image. The auxiliary capacitance line LCS has both a function as a signal line for supplying the auxiliary capacitance signal CS and a function as the second drive line supplied with the second drive signal FRP, which is the non-display signal of an image. In this structure, the number of lines in the display area DA is reduced. Thus, it is possible to realize a high fineness for the subpixels SPX and improve the rate of opening.

In a storage period, switching elements Q1 and Q2 are off. Thus, the pixel electrode PE is set to a floating state. One of the problems to be caused by this situation is explained with reference to FIG. 7 to FIG. 9.

Figure 7:
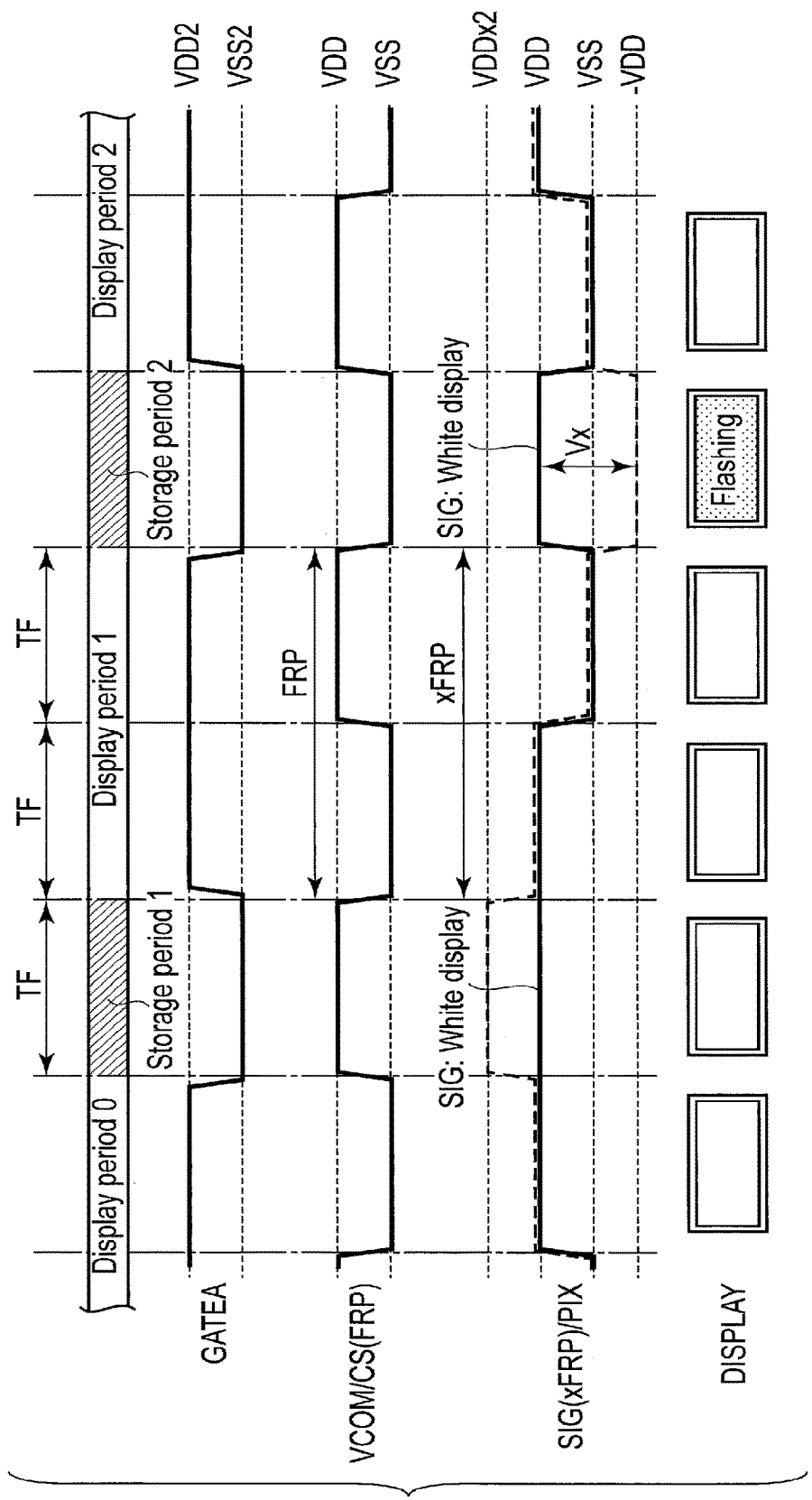
FIG. 7 is a timing chart shown for explaining an example of problems which can be caused in a digital mode.

FIG. 7 is a timing chart showing the change in the scanning signal GATEA, the common signal VCOM, the auxiliary capacitance signal CS (FRP), the display signal SIG (xFRP) and the pixel potential PIX in the storage and display periods repeated through time. In this example, all of the subpixels SPX of the display area DA are continuously set to white display. Here, one frame period TF constitutes a storage period. Two frame periods TF constitute a display period. However, more frame periods TF may constitute a storage period and a display period.

In storage period 1 on the left side in the figure, the display signal SIG (solid line) of voltage VDD is supplied in order to make the potential of the memory 10 high. In storage period 1, the scanning signal GATEA is decreased to voltage VSS2. The pixel electrode PE is set to a floating state. Thus, the pixel potential PIX (dashed line) is drawn to the increase in the potential of the common signal VCOM, and thus, is increased. The pixel potential PIX is increased to voltage VDDx2 such that the difference in potential between the pixel potential PIX and the common signal VCOM in display period 0 immediately before storage period 1 is maintained. Voltage VDDx2 is the voltage which is approximately twice the difference between voltage VDD and voltage VSS.

In display period 1 subsequent to storage period 1, the AC first drive signal xFRP is supplied to the signal line S. In storage period 2 subsequent to display period 1, the display signal SIG of voltage VDD is supplied again such that the memory 10 is kept high. In storage period 2, the pixel electrode PE is in a floating state. Thus, the pixel potential PIX is drawn to the decrease in the potential of the common signal VCOM, and thus, is decreased. Thus, the pixel potential PIX is decreased to voltage −VDD such that the difference in potential between the pixel potential PIX and the common signal VCOM in display period 1 immediately before storage period 2 is maintained. Voltage −VDD is less than voltage VSS by approximately the difference between voltage VDD and voltage VSS. Thus, in storage period 2, a large difference Vx in potential is produced between the signal line S and the pixel electrode PE.

Figure 8:
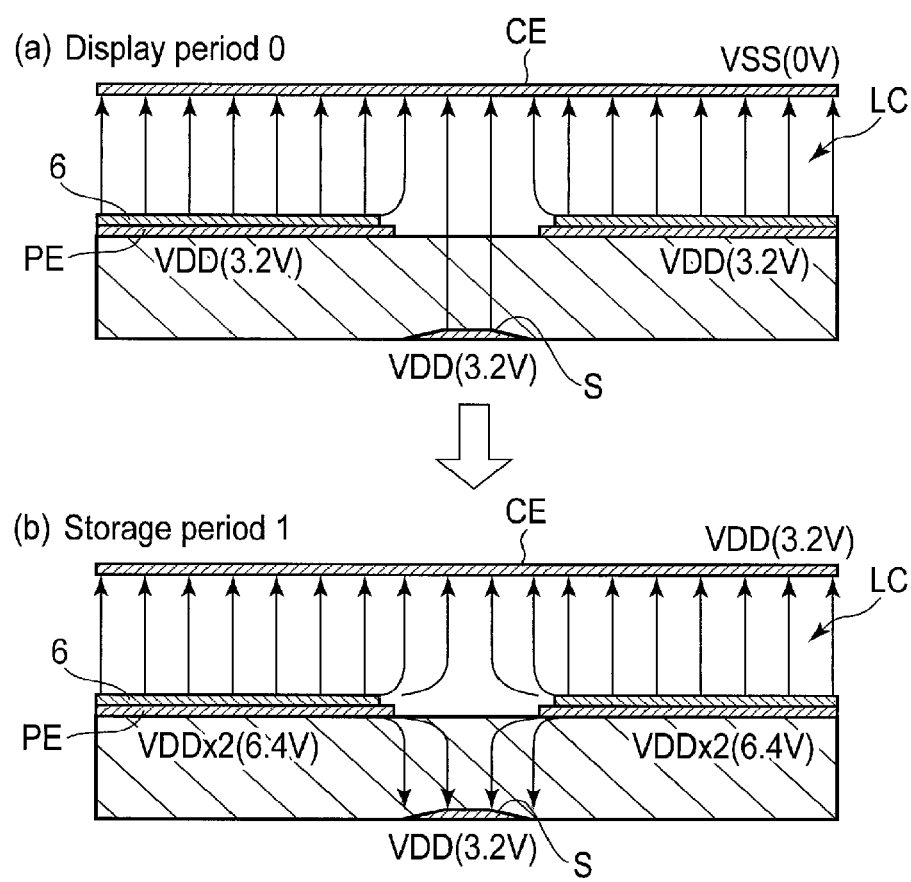
FIG. 8 is a cross-sectional view showing each electric field produced in a subpixel in display and storage periods of the timing chart of FIG. 7.

FIG. 8 is a cross-sectional view showing each electric field produced in the subpixel SPX (a) in display period 0 immediately before storage period 1 and (b) in storage period 1. In this example, the reflective layer 6 is formed on a surface of the pixel electrode PE on the liquid crystal layer LC side. The reflective layer 6 reflects, toward the second substrate SUB2, the light which has entered the second substrate SUB2, has passed through the liquid crystal layer LC and has reached the first substrate SUB1. In FIG. 8(a), the pixel electrode PE has voltage VDD, and the common electrode CE has voltage VSS. Thus, an electric field from the pixel electrode PE to the common electrode CE is produced. Since the signal line S has voltage VDD, an electric field from the signal line S to the common electrode CE is also produced.

In FIG. 8(b), the pixel electrode PE has voltage VDDx2. The common electrode CE and the signal line S have voltage VDD. Thus, an electric field from the pixel electrode PE to the common electrode CE is produced. In addition, an electric field from the pixel electrode PE to the signal line S is produced.

For example, when voltage VSS is zero, and voltage VDD is 3.2 V, voltage VDDx2 is approximately 6.4 V. In this case, each electric field produced in FIG. 8(a) and FIG. 8(b) is caused by a potential difference of 3.2 V.

Figure 9:
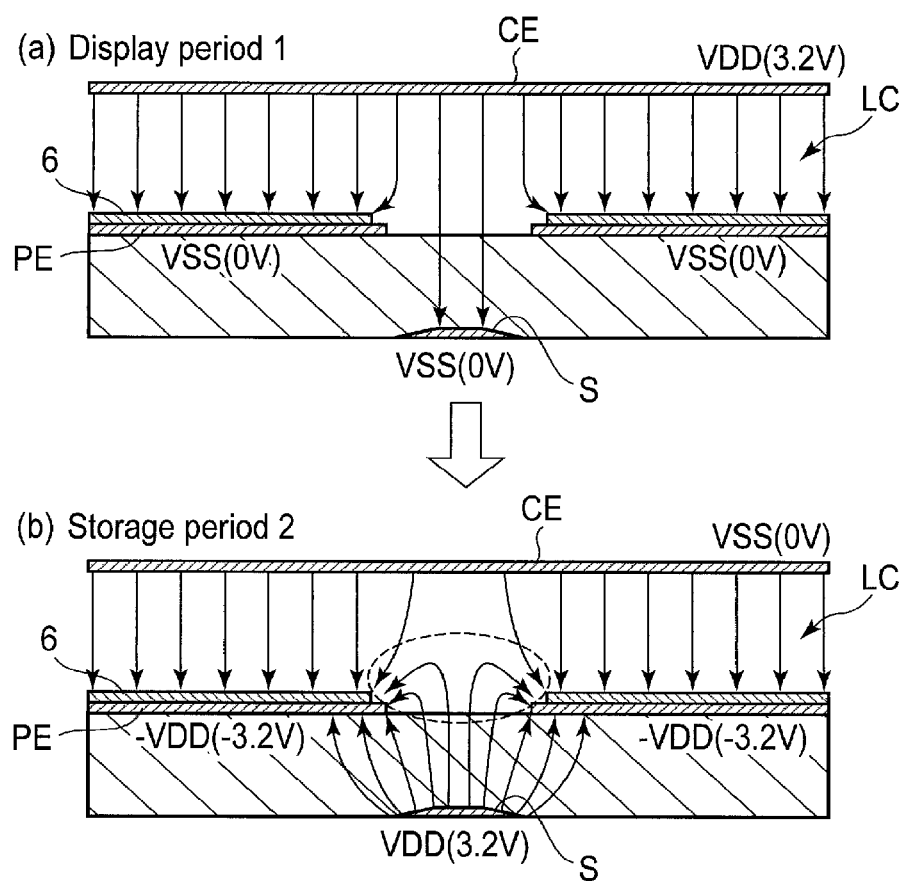
FIG. 9 is a cross-sectional view showing each electric field produced in a subpixel in other display and storage periods of the timing chart of FIG. 7.

FIG. 9 is a cross-sectional view showing each electric field produced in the subpixel SPX (a) in display period 1 immediately before storage period 2 and (b) in storage period 2. In FIG. 9(a), the pixel electrode PE and the signal line S have voltage VSS, and the common electrode CE has voltage VDD. Thus, electric fields from the common electrode CE to the pixel electrode PE and the signal line S are produced.

In FIG. 9(b), the pixel electrode PE has voltage −VDD. The common electrode CE has voltage VSS. The signal line S has voltage VDD. In this case, mainly, an electric field from the common electrode CE to the pixel electrode PE, and an electric field from the signal line S to the pixel electrode PE are produced.

For example, when voltage VSS is zero, and voltage VDD is 3.2 V, voltage −VDD is approximately −3.2 V. In this case, the electric field produced between the pixel electrode PE and the common electrode CE in FIG. 9(a) and FIG. 9(b) is caused by a potential difference of 3.2 V. The electric field produced between the pixel electrode PE and the signal line S in FIG. 9(b) is caused by a potential difference Vx of 6.4 V and thus, strong. This strong electric field affects the vertical electric field between the pixel electrode PE and the common electrode CE as shown in the area surrounded by the dashed circle in FIG. 9(b). Thus, the performance of alignment control of the liquid crystal layer LC is reduced. In this way, the luminance of the subpixel SPX may be reduced.

On the bottom of FIG. 7, the display area DA (DISPLAY) which displays an image is schematically shown. It is assumed that all of the subpixels SPX are continuously set to white display. Thus, the entire display area DA is continuously set to white display in principle. However, in storage period 2, a flashing phenomenon in which the image of the display area DA is dark in comparison with the other periods is generated because of the reduction in luminance caused by potential difference Vx. This flashing phenomenon leads to degradation in display quality.

In the above example, white display is explained. In a case of black display, similarly, a large difference Vx in potential is formed between the pixel electrode PE and the signal line S in a storage period. Thus, a flashing phenomenon may be generated.

Hereinafter, this specification discloses various embodiments to prevent the degradation in display quality caused by a flashing phenomenon.

First Embodiment

In a first embodiment, when a display period transitions to a storage period, the potential of a common signal VCOM and an auxiliary capacitance signal CS (FRP) in the display period is maintained in the storage period. In this way, a flashing phenomenon is prevented. The details of the present embodiment are explained below.

Figure 10:
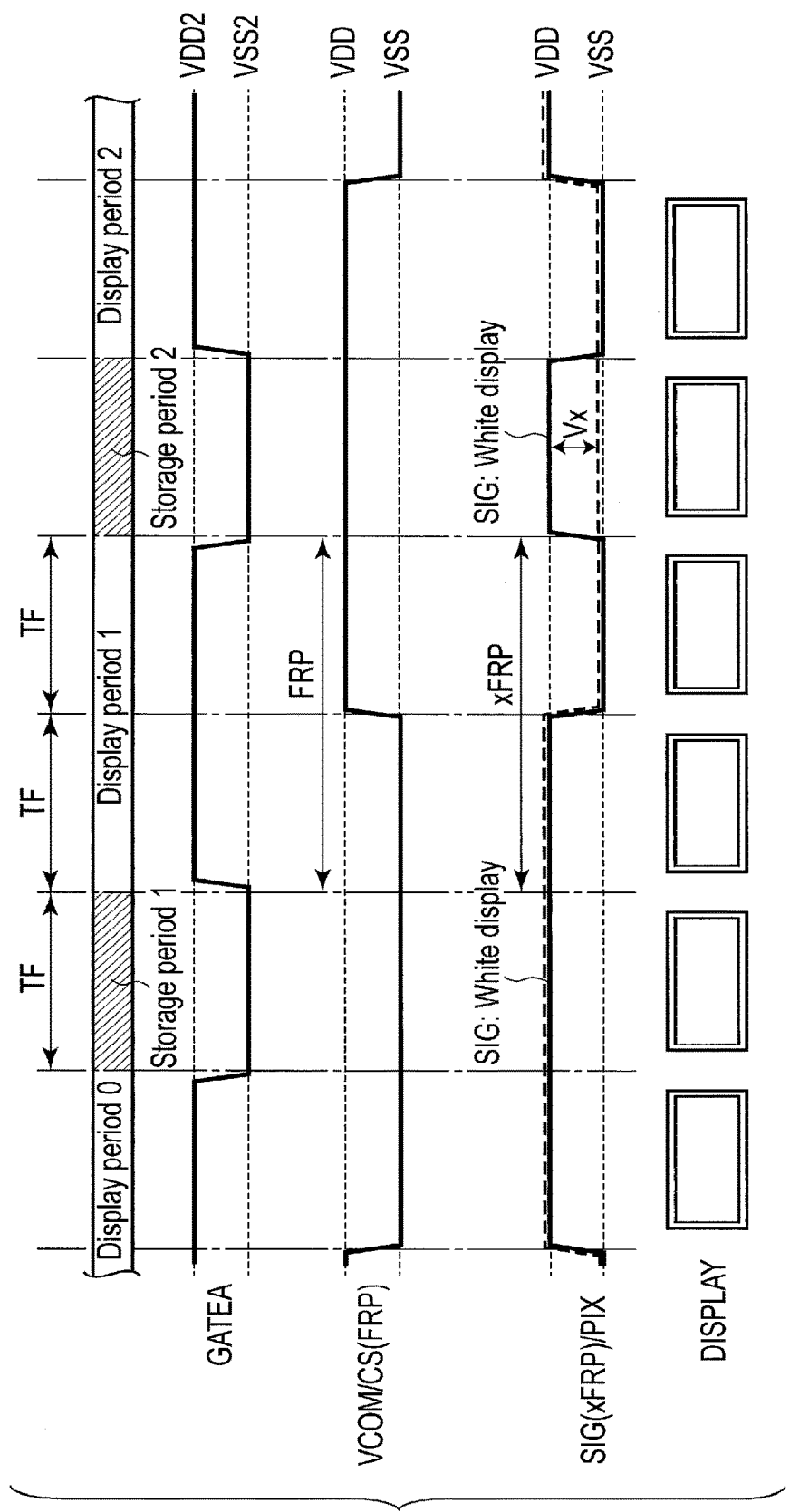
FIG. 10 is a timing chart showing an example of an operation performed by a display device according to a first embodiment.

FIG. 10 is a timing chart showing an example of an operation performed by a display device 1 according to the first embodiment. FIG. 10 assumes that each subpixel SPX is set to white display in a manner similar to that of FIG. 7. FIG. 10 shows the potential of each signal in display period 0, storage period 1, display period 1, storage period 2 and display period 2 through time.

Immediately before storage period 1, in other words, in the second frame period TF of display period 0, the voltage of the common signal VCOM and the auxiliary capacitance signal CS is VSS. In this case, an AC drive circuit 20 maintains the voltage of the common signal VCOM and the auxiliary capacitance signal CS so as to be VSS in storage period 1. The AC drive circuit 20 stops the AC output in storage period 1. In display period 1 subsequent to storage period 1, the AC drive circuit 20 restarts the AC output. In this way, the common signal VCOM and the auxiliary capacitance signal CS are AC signals (FRP) which change between voltage VSS and voltage VDD depending on the frame period TF.

Immediately before storage period 2, in other words, in the second frame period TF of display period 1, the voltage of the common signal VCOM and the auxiliary capacitance signal CS is VDD. In this case, the AC drive circuit 20 stops the AC output and maintains the voltage of the common signal VCOM and the auxiliary capacitance signal CS so as to be VDD in storage period 2. The AC drive circuit 20 restarts the AC output in display period 2 subsequent to storage period 2.

The waveform of a display signal SIG (xFRP) in FIG. 10 is the same as that in FIG. 7. However, the waveform of pixel potential PIX in FIG. 10 differs from that in FIG. 7. The pixel potential PIX is voltage VDD in storage period 1 since the common signal VCOM has voltage VSS. The pixel potential PIX is voltage VSS in storage period 2 since the voltage of the common signal VCOM is VDD.

In the example of FIG. 7, the difference Vx in potential between a pixel electrode PE and a signal line S is larger than the difference between voltage VDD and voltage VSS in storage period 2. However, in the example of FIG. 10, the difference Vx in potential is within the difference between voltage VDD and voltage VSS. In this way, in the present embodiment, a flashing phenomenon is prevented. Thus, the degradation in display quality can be prevented.

In this example, white display is explained. In a case of black display, similarly, a flashing phenomenon can be prevented. In the present embodiment, the AC output of the common signal VCOM is stopped in both storage period 1 and storage period 2. However, the AC output may be stopped only in one or some of the storage periods.

In the present embodiment, a flashing phenomenon is prevented by controlling the output of the AC drive circuit 20. No new line or element is used. Thus, the fineness of the subpixels SPX is not reduced. Further, the density of the circuit pattern is not increased, and thus, the yield ratio of manufacturing is not degraded.

In addition to the effects explained above, various excellent effects can be obtained from the present embodiment.

Second Embodiment

In a second embodiment, a flashing phenomenon is difficult to be captured by users with eyes since each storage period is short. The details of the present embodiment are explained below.

Figure 11:
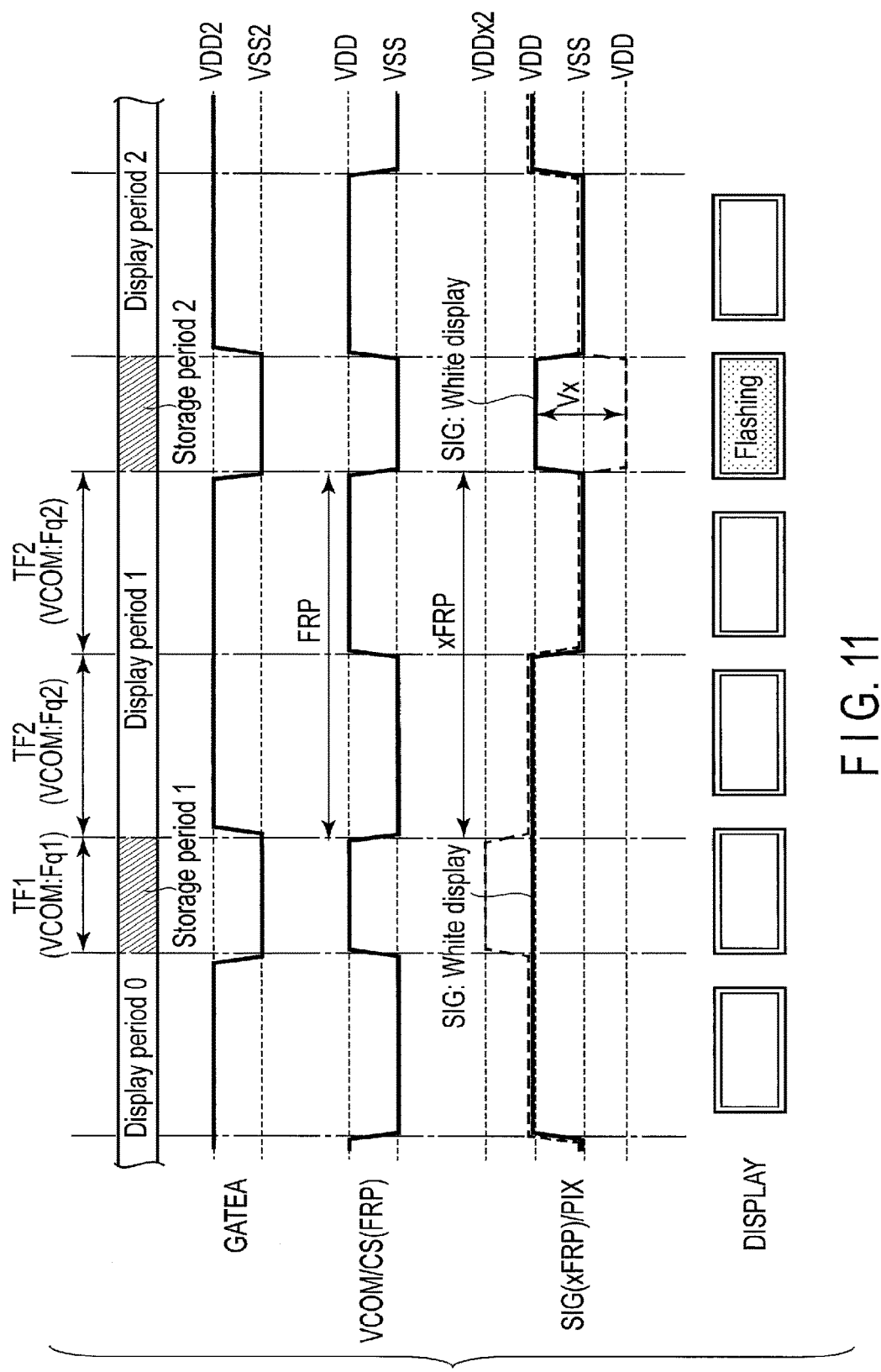
FIG. 11 is a timing chart showing an example of an operation performed by a display device according to a second embodiment.

FIG. 11 is a timing chart showing an example of an operation performed by a display device 1 according to the second embodiment. In a manner similar to that of FIG. 7, FIG. 11 assumes that each subpixel SPX is set to white display. FIG. 11 shows the potential of each signal in display period 0, storage period 1, display period 1, storage period 2 and display period 2 through time.

The waveform of each signal in each display period and each storage period is the same as that of FIG. 7. However, in FIG. 11, each storage period consists of a frame period TF1. Each display period consists of frame periods TF2. Each frame period TF1 is shorter than each frame period TF2 (TF1<TF2).

The frequency of a common signal VCOM and an auxiliary capacitance signal CS output by an AC drive circuit 20 in each storage period is a first frequency Fq1 (Hz). The frequency of the common signal VCOM and the auxiliary capacitance signal CS (FRP) output by the AC drive circuit 20 in each display period is a second frequency Fq2 (Hz). Each frame period TF1 is shorter than each frame period TF2. Thus, the first frequency Fq1 is higher than the second frequency Fq2 (Fq1>Fq2). This frequency is based on the number of waveforms from a specific value to the specific value through the maximum or minimum value as shown in FIG. 10.

In the example of FIG. 11, in a manner similar to that of FIG. 7, the difference Vx in potential between a pixel electrode PE and a common electrode CE is large in storage period 2. In this manner, a flashing phenomenon may be produced. However, the first frequency Fq1 is higher than the second frequency Fq2. Thus, the time in which the luminance is reduced is relatively short in storage period 2. For this reason, a flashing phenomenon is unnoticeable.

When the first frequency Fq1 is greater than or equal to 1.5 times the second frequency Fq2, it is possible to appropriately prevent the degradation in display quality caused by a flashing phenomenon. When the first frequency Fq1 is greater than or equal to twice the second frequency Fq2, it is possible to obtain a higher effect of preventing the degradation in display quality. To stably store potential in a memory 10, the first frequency Fq1 is preferably less than or equal to 5 times the second frequency Fq2.

In addition, when the first frequency Fq1 is greater than or equal to 90 Hz, users are difficult to notice a flashing phenomenon with eyes. Thus, it is possible to appropriately prevent the degradation in display quality. The first frequency Fq1 is more preferably greater than or equal to 120 Hz since a flashing phenomenon is hardly visible in this range. The second frequency Fq2 may be determined as, for example, approximately 60 Hz. To stably store potential in the memory 10, the first frequency Fq1 is preferably less than or equal to 300 Hz.

In the above description, white display is explained. In a case of black display, similarly, a flashing phenomenon can be prevented.

In the present embodiment, a flashing phenomenon is prevented by controlling the output of the AC drive circuit 20 in a manner similar to that of the first embodiment. No new line or element is used. In this way, the fineness of subpixels SPX is not reduced. Further, the density of circuit pattern is not increased, and thus, the yield ratio of manufacturing is not degraded.

In addition to the effects explained above, various excellent effects can be obtained from the present embodiment.

Third Embodiment

In a third embodiment, a flashing phenomenon is prevented by allowing a display period to transition to a storage period when pixel potential PIX satisfies a predetermined condition. The details of the present embodiment are explained below.

Figure 12:
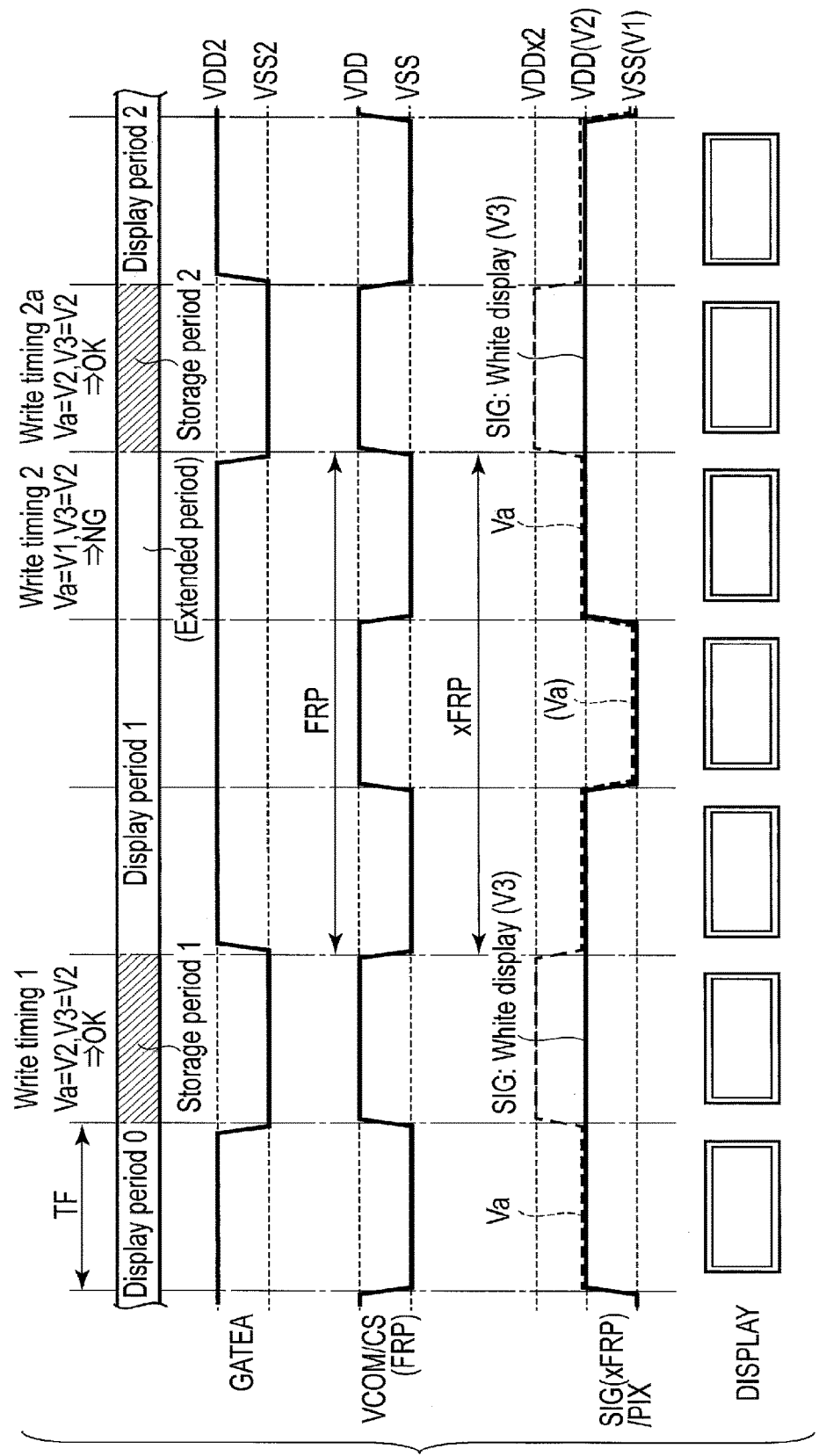
FIG. 12 is a timing chart showing an example of an operation performed by a display device according to a third embodiment.

FIG. 12 is a timing chart showing an example of an operation performed by a display device 1 according to the third embodiment. FIG. 12 assumes that each subpixel SPX is set to white display in a manner similar to that of FIG. 7. FIG. 12 shows the potential of each signal in display period 0, storage period 1, display period 1, storage period 2 and display period 2 through time.

In the present embodiment, when a display period transitions to a storage period, a control device 2 determines whether the transition is possible. For this determination, potential Va, first potential V1, second potential V2 and third potential V3 are used. Potential Va is pixel potential PIX immediately before the start of each storage period. The first potential V1 is a low voltage VSS of a first drive signal xFRP. The second potential V2 is a high voltage VDD of the first drive signal xFRP. The third potential V3 is the potential of a display signal SIG stored in a memory 10 in each storage period.

Specifically, the control device 2 determines that the transition to a storage period is possible when the following execution condition is met: "potential Va is, out of the first potential V1 and the second potential V2, the potential having a smaller difference from the third potential V3". In this case, a display period transitions to the storage period, and the third potential V3 is stored in the memory 10. When the above execution condition is not met, the control device 2 determines that the transition to the storage period is impossible. In this case, even if the write timing at which the display period is supposed to transition to the storage period has been reached, the display period does not transition to the storage period. The display period is extended only by one or more predetermined frame periods TF (for example, one frame period TF). The control device 2 determines again whether the transition to the storage period is possible. When the transition is possible, the display period transitions to the storage period.

The specific example is explained with reference to FIG. 12. The third potential V3 to be stored in the memory 10 in storage period 1 is white potential VDD. In this case, out of the first potential V1 (VSS) and the second potential V2 (VDD), the potential having a smaller difference from the third potential V3 is the second potential V2, which has no difference from the third potential V3. In display period 0 immediately before write timing 1 at which storage period 1 should be executed, potential Va is the second potential V2. Thus, the above execution condition is met, and the transition to the storage period is possible. At write timing 1, the operation of storage period 1 is performed.

In display period 1 immediately before write timing 2 at which storage period 2 should be executed, potential Va (in parentheses in the figure) is the first potential V1. In storage period 2, the third potential V3 to be stored in the memory 10 is VDD. In this case, the above condition is not met. Thus, the transition to the storage period is impossible. At write timing 2, the operation of storage period 2 is not performed. Display period 1 is extended only by one frame period TF.

Subsequently, in display period 1 immediately before write timing 2a at which the operation of storage period 2 should be performed after the extension (in other words, in the extended period in the example of FIG. 12), potential Va is the second potential V2. In this case, the above execution condition is met. Thus, the transition to the storage period is possible. In this way, the operation of storage period 2 is performed at write timing 2a.

In the example of FIG. 12, display period 1 is extended only by one frame period TF when the execution condition is not met. However, display period 1 may be extended by more frame periods TF.

In the above description, it is assumed that all of the subpixels SPX included in a display area DA are set to white display. However, the same control can be applied when all of the subpixels SPX are set to black display, or when subpixels SPX for white display and subpixels SPX for black display are mixed. When subpixels SPX for white display and subpixels SPX for black display are mixed, subpixels SPX in which voltage Va is different from the third potential V3 are present at one write timing. In this case, for example, when the number of subpixels SPX which satisfy the above condition is greater than or equal to a threshold out of all of the subpixels SPX, the display period may be extended. Thus, the storage period may be put off. The flashing phenomenon in subpixels SPX for black display less affects the display quality than that for white display. Thus, when the execution condition is met in all of the subpixels SPX for white display, or when the number of subpixels SPX which satisfy the above condition is greater than or equal to a threshold out of the subpixels SPX for white display, the display period may be extended. Thus, the storage period may be put off.

In the present embodiment, the potential of the display signal SIG in each storage period is close to (in the example of FIG. 12, is the same as) the pixel potential PIX immediately before the storage period. Thus, even if the potential of a pixel electrode PE in a floating state in the storage period changes in accordance with the potential of a common electrode CE, the large difference Vx in potential shown in FIG. 7 is not produced. In this way, a flashing phenomenon can be prevented.

In addition to the effects explained above, various excellent effects can be obtained from the present embodiment.

Fourth Embodiment

Figure 13:
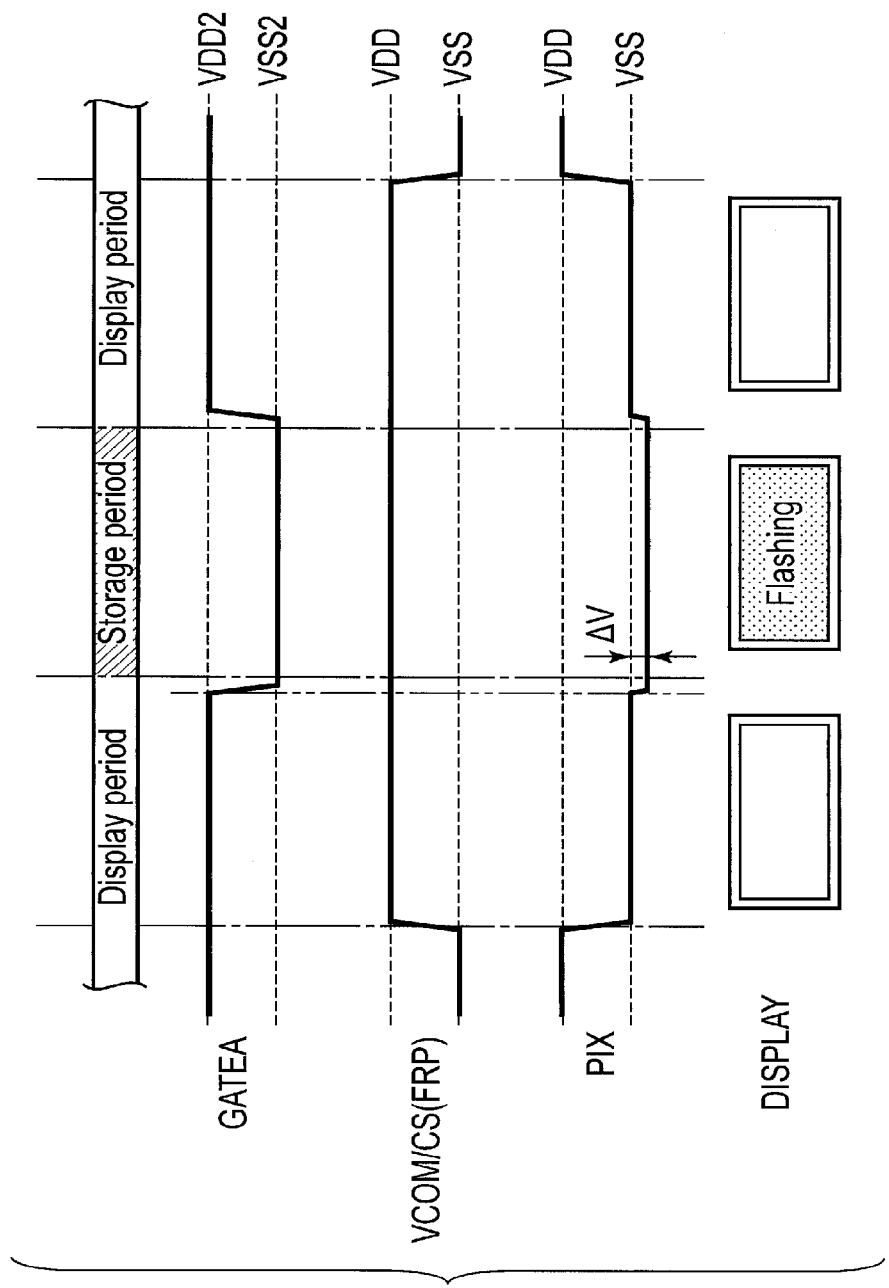
FIG. 13 is a timing chart shown for explaining other problems which can be caused in a digital mode.

In the first to third embodiments, this specification discloses methods for solving the problems explained with reference to FIG. 7 to FIG. 9. Other problems which can be caused in a digital mode are explained using the timing chart of FIG. 13.

When a display period transitions to a storage period, a scanning signal GATEA is decreased to voltage VSS2, and switching elements Q1 and Q2 are off. In this way, a select signal line 12a is electrically disconnected from a pixel electrode PE. Thus, the pixel electrode PE is set to a floating state. When the scanning signal GATEA is decreased, pixel potential PIX could be also decreased by a predetermined potential ΔV by capacitive coupling between the pixel electrode PE and a scanning line G. In this case, the luminance of subpixels SPX changes in the storage period. Thus, the display quality is degraded.

To prevent the change in luminance, in the present embodiment, the potential of a common signal VCOM and an auxiliary capacitance signal CS is decreased by a defined amount before switching elements Q1 and Q2 electrically disconnect the select signal line 12a from the pixel electrode PE. The specific example of this operation is shown below.

Figure 14:
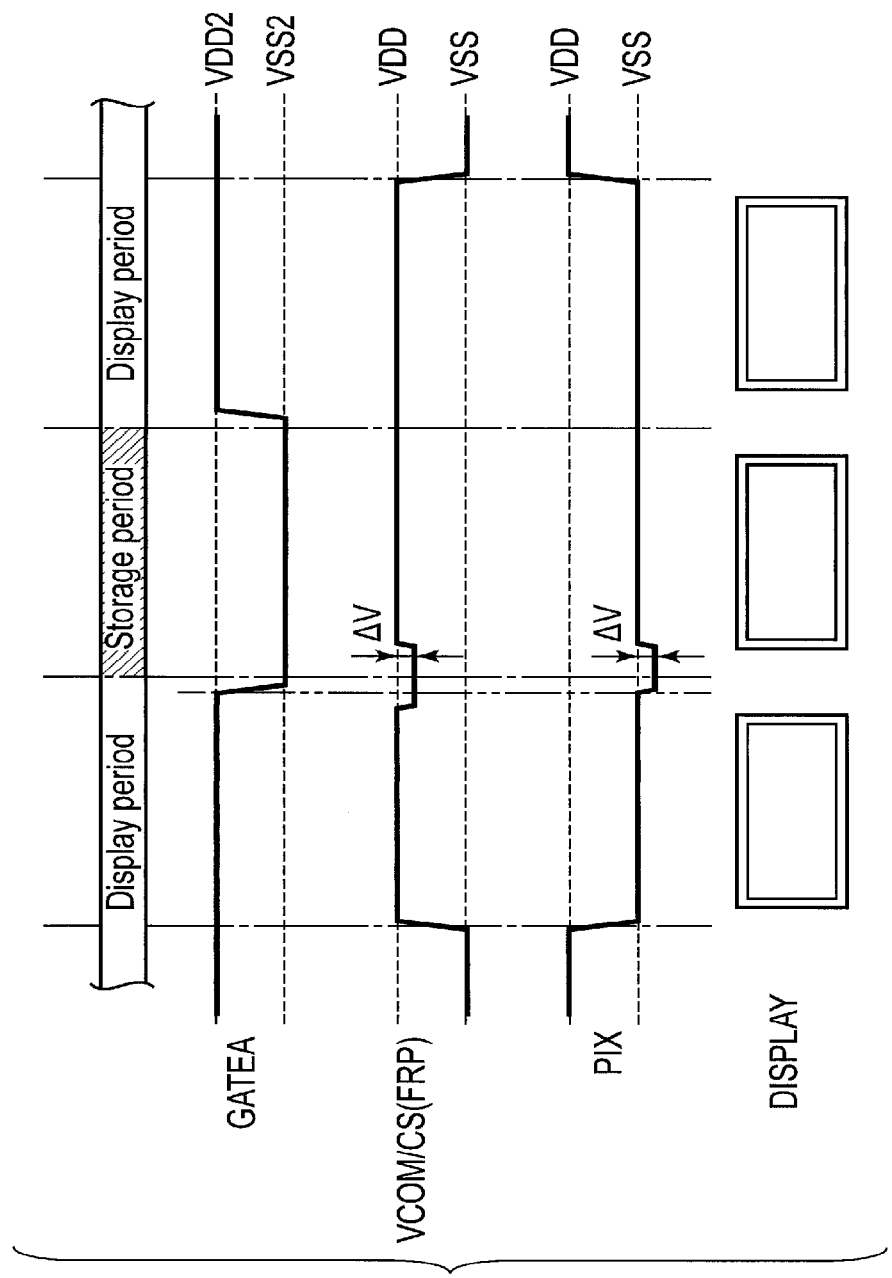
FIG. 14 is a timing chart showing an example of an operation performed by a display device according to a fourth embodiment.

FIG. 14 is a timing chart showing an example of an operation performed by a display device 1 according to the fourth embodiment. This timing chart is an example in which the present embodiment is applied to the operation of the first embodiment. When a display period transitions to a storage period, an AC drive circuit 20 decreases the potential of the common signal VCOM and the auxiliary capacitance signal CS by a defined amount (ΔV in the example of FIG. 14) at a timing slightly earlier than the timing at which the scanning signal GATEA is decreased.

When the scanning signal GATEA is decreased, the pixel potential PIX is decreased by potential ΔV by capacitive coupling between the scanning line G and the pixel electrode PE. After the scanning signal GATEA is decreased, and the select signal line 12a is electrically disconnected from the pixel electrode PE, the AC drive circuit 20 increases the potential of the common signal VCOM and the auxiliary capacitance signal CS by the defined amount ΔV. At this time, the pixel electrode PE is in a floating state. Thus, the pixel potential PIX is drawn to the increase in the potential of the common signal VCOM. Thus, the pixel potential PIX is also increased by the defined amount ΔV.

By the above operation, the difference in potential between the pixel electrode PE and the common electrode CE in each display period is maintained in the storage period immediately after the display period. Thus, it is possible to prevent change in luminance caused by capacitive coupling between the scanning line G and the pixel electrode PE.

In the example of FIG. 14, the defined amount is potential ΔV. However, the defined amount is not necessarily the same as potential ΔV. Even when the defined amount is less than potential ΔV, the defined amount could contribute to reduction in change in luminance in each storage period.

The AC drive circuit 20 may maintain the decrease in the common signal VCOM by the defined amount over the entire storage period.

In the example of FIG. 14, the present embodiment is applied to the operation of the first embodiment. However, the present embodiment may be applied to the operation of the second or third embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the structures disclosed in each embodiment may be arbitrarily combined.

In each embodiment, a display device having the functions of an analog mode and a digital mode is disclosed. However, the operation of the display device of each embodiment may be applied to a display device having only the function of a digital mode.

What is claimed is:
1. A display device comprising:
a pair of substrates having a display area in which a plurality of pixels are provided;
a liquid crystal layer sealed between the pair of substrates;
a pixel electrode provided in each of the pixels;
a common electrode which faces the pixel electrode and produces a difference in potential for driving the liquid crystal layer between the common electrode and the pixel electrode;
a signal line to which a digital signal based on image data is supplied;
a first drive circuit configured to supply the digital signal to the signal line;
a second drive circuit configured to supply an AC common signal to the common electrode, the AC common signal oscillating between a low voltage VSS and a high voltage VDD;
a memory provided in each of the pixels in the display area;
a first drive line to which a display signal of an image is supplied;
a second drive line to which a non-display signal of an image is supplied;
a storage control circuit configured to store the digital signal supplied to the signal line in the memory in a storage period;
a select control circuit configured to selectively supply, in a display period, to the pixel electrode, one of the display signal and the non-display signal, the one corresponding to the digital signal stored in the memory, and
a gate circuit configured to switch a connection between the select control circuit and the pixel electrode, wherein
the gate circuit electrically disconnects the select control circuit from the pixel electrode during the storage period, and electrically connects the select control circuit and the pixel electrode during the display period, and
the second drive circuit changes a voltage of the common electrode from the low voltage VSS to the high voltage VDD during the display period, and keeps the high voltage VDD continuously from a middle of the display period until an end of the storage period which is a next period following the display period.

2. The display device of claim 1, wherein
the select control circuit comprises a select signal line which is connected to one of the first drive line and the second drive line, the one corresponding to the digital signal stored in the memory.

3. The display device of claim 1, wherein
a polarity of potential between the pixel electrode and the common electrode is periodically inverted in the display period.

4. The display device of claim 1, wherein
the signal line extends, passing between the adjacent pixels,
at least one of the substrates comprises a light-shielding layer which blocks light, and
the light-shielding layer does not overlap the signal line between the adjacent pixels.

5. The display device of claim 1, wherein
the substrates include a first substrate and a second substrate,
the pixel electrode is provided in the first substrate,
the first substrate comprises a reflective layer which reflects, toward the second substrate, light which has reached the first substrate from the second substrate, and
an image is displayed by the light reflected by the reflective layer.

6. The display device of claim 5, further comprising a digital mode and an analog mode, wherein
the first drive line is the same line as the signal line,
operations of the storage period and the display period are performed in the digital mode, and
a signal based on a gradation of an image is supplied to the first drive line in the analog mode.

7. The display device of claim 5, further comprising a capacitance line which forms a capacitance for driving the liquid crystal layer between the capacitance line and the pixel electrode, wherein
the second drive line is the same line as the capacitance line.

* * * * *